(12) United States Patent
Zhang

(10) Patent No.: US 11,121,888 B2
(45) Date of Patent: Sep. 14, 2021

(54) INTELLIGENT SERVICE PLATFORM AND METHOD

(71) Applicant: Jisheng Zhang, Jinan (CN)

(72) Inventor: Jisheng Zhang, Jinan (CN)

( * ) Notice: Subject to any disclaimer, the term of this patent is extended or adjusted under 35 U.S.C. 154(b) by 15 days.

(21) Appl. No.: 16/623,395

(22) PCT Filed: Aug. 15, 2018

(86) PCT No.: PCT/CN2018/100710
§ 371 (c)(1),
(2) Date: Dec. 17, 2019

(87) PCT Pub. No.: WO2020/024333
PCT Pub. Date: Feb. 6, 2020

(65) Prior Publication Data
US 2021/0119821 A1    Apr. 22, 2021

(30) Foreign Application Priority Data

Aug. 3, 2018 (CN) .......................... 201810879948.7

(51) Int. Cl.
*H04L 12/28* (2006.01)
*G06F 9/451* (2018.01)
(Continued)

(52) U.S. Cl.
CPC ............ *H04L 12/282* (2013.01); *G05B 15/02* (2013.01); *G06F 9/451* (2018.02); *G06F 16/9535* (2019.01)

(58) Field of Classification Search
None
See application file for complete search history.

(56) References Cited

U.S. PATENT DOCUMENTS 10,810,005 B2 * 10/2020 Hua ...................... G06F 3/0488
2006/0156281 A1 * 7/2006 Yoon ................... H04L 12/2803
717/106

(Continued)

FOREIGN PATENT DOCUMENTS

CN       102043404 A    5/2011
CN       102591942 A    7/2012
(Continued)

*Primary Examiner* — Charles E Anya
(74) *Attorney, Agent, or Firm* — Bayramoglu Law Offices LLC

(57) ABSTRACT

An intelligent service platform and method comprising a theme type determining module, a matching module, a theme type recognition module, an application recognition module, an application importing module, and a program starting module, wherein the theme type recognition module recognizes, after receiving a first manipulation instruction from a user, a theme type corresponding to the first manipulation instruction, and displays each application matching the theme type on a display screen; and the application recognition module recognizes, after receiving a second manipulation instruction from the user, an application corresponding to the second manipulation instruction, imports the corresponding application through the application importing module, and starts the operating of the application through the program starting module. In this way, the intelligent service platform classifies a wide variety of existing applications with similar functions, so that use interfaces of user applications are more concise, and the user experience is improved.

4 Claims, 1 Drawing Sheet

---

S201 — Determining a first theme type according to collected big data of different user groups S202 — Obtaining, by means of matching, each application corresponding to each theme type according to the first theme type, and displaying each application corresponding to each theme type on a display screen S203 — Recognizing, after receiving a first manipulation instruction from a user, a theme type corresponding to the first manipulation instruction, and displaying each application matching the theme type on the display screen S204 — Recognizing, after receiving a second manipulation instruction from the user, an application corresponding to the second manipulation instruction, importing the corresponding application, and starting the operating of the application

(51) Int. Cl.
*G06F 16/9535* (2019.01)
*G05B 15/02* (2006.01)

(56) References Cited

U.S. PATENT DOCUMENTS

| | | | |
|---|---|---|---|
| 2013/0298034 A1* | 11/2013 | Ramachandran | G06F 9/451 |
| | | | 715/748 |
| 2014/0324873 A1* | 10/2014 | Lee | G06F 9/44 |
| | | | 707/740 |
| 2017/0322702 A1* | 11/2017 | Wang | G06F 3/04845 |
| 2018/0020004 A1* | 1/2018 | Ferguson | H04L 67/306 |
| 2018/0143891 A1* | 5/2018 | Polisetty | G06F 11/3006 |
| 2019/0129575 A1* | 5/2019 | Wang | G06F 9/461 |
| 2019/0306024 A1* | 10/2019 | Petria | H04L 67/34 |

FOREIGN PATENT DOCUMENTS

| | | |
|---|---|---|
| CN | 103647800 A | 3/2014 |
| CN | 103973527 A | 8/2014 |
| CN | 104063454 A | 9/2014 |
| CN | 105227445 A | 1/2016 |
| CN | 107809526 A | 3/2018 |
| CN | 108200273 A | 6/2018 |
| EP | 2469813 A1 | 6/2012 |
| EP | 2565783 A1 | 3/2013 |
| EP | 2706704 A1 | 3/2014 |
| EP | 2813953 A1 | 12/2014 |
| EP | 3005150 A2 | 4/2016 |
| EP | 3080725 A1 | 10/2016 |
| EP | 3198422 A1 | 8/2017 |
| WO | 2014047501 A1 | 3/2014 |

\* cited by examiner

INTELLIGENT SERVICE PLATFORM AND METHOD

CROSS REFERENCES TO THE RELATED APPLICATIONS

This application is the national phase entry of International Application No. PCT/CN2018/100710, filed on Aug. 15, 2018, which is based upon and claims priority to Chinese Patent Application No. 201810879948.7, filed on Aug. 3, 2018, the entire contents of which are incorporated herein by reference.

TECHNICAL FIELD

The present invention relates to the technical field of intelligent applications, and in particular to an intelligent service platform and method.

BACKGROUND

With the application of the Internet and the development of Internet of Things technologies, there are a wide variety of existing applications, which can cover almost all aspects of material and cultural consumption and social public services. In addition, with the popularization of computer programming technologies, the increasing miniaturization of enterprises such as manufacturing, service, and cultural industries and the increasingly lowed investment threshold, everyone can program any object that can be used as a communication terminal, and can provide any service for material and spiritual consumption. That is, everyone can write applications and can become a supplier for material or cultural products.

With the popularization of various communication terminals such as computers, smart phones, digital televisions, wearable devices, toys, robots, and various transportation means such as vehicles and ships, as well as the increasingly-lowered price thereof, and with the breakthrough and popularization of display technologies such as "Alipay Air", especially with the development of Internet technologies and the development of integrated technologies, theoretically, all objects are likely to become communication terminals, etc., so that human beings can conveniently use the communication terminals in any way in any place at any time; and especially with the increasing maturity of technologies such as cloud computing, big data, cloud storage, blockchain, and Internet of Things, it can be extremely convenient for people to seek the help of computing technologies for all needs.

There are a wide variety of existing applications with similar functions, which makes user interfaces of user applications disorganized and difficult to manage, and causes a low user experience. Especially for some pay applications with similar learning content, it is more difficult for users to manage them. How to manage a wide variety of applications with similar functions so as to make the user interfaces of the user applications more concise is a technical problem to be solved.

SUMMARY

An objective of the present invention is to provide an intelligent service platform and method, to solve the problems that a wide variety of existing applications with similar functions cannot be effectively managed, and user interfaces of user applications are disorganized and disordered.

To achieve the above objective, the present invention provides an intelligent service platform, the platform comprising: a theme type determining module, a matching module, a theme type recognition module, an application recognition module, an application importing module, and an application starting module, wherein the theme type determining module determines a first theme type according to collected big data of different user groups; the matching module obtains, by means of matching, each application corresponding to each theme type according to the first theme type, and displays each application corresponding to each theme type on a display screen; the theme type recognition module recognizes, after receiving a first manipulation instruction from a user, a theme type corresponding to the first manipulation instruction, and displays each application matching the theme type on the display screen; and the application recognition module recognizes, after receiving a second manipulation instruction from the user, an application corresponding to the second manipulation instruction, imports the corresponding application through the application importing module, and starts the operating of the application through the application starting module.

Optionally, the first theme type comprises at least one of the following: an intelligent home control center, a transportation means control center, local or community, news, video, audio, search, social contact, shopping, catering, travel, entertainment, health, education, and office.

Optionally, the application comprises at least one of a third-party application and a user independently-developed application.

Optionally, the theme type determining module is further used to determine a corresponding second theme type according to preference information of the user, wherein the preference information of the user comprises at least one of the following: information of the third-party application and/or the independently-developed application whose frequency of use by the current user is higher than a corresponding preset frequency, information of a theme type corresponding to the third-party application, information of a theme type corresponding to the independently-developed application, information of a commodity that the current user follows, information of the brand of the commodity that the current user follows, information of a store for the commodity that the current user follows, information of a consumption behavior of the current user, and information of a consumption frequency of the current user.

Optionally, the platform further comprises an intelligent home appliance terminal management module, the intelligent home appliance terminal management module managing collected operating data of a controlled intelligent home appliance terminal, wherein the operating data comprises at least one of the following: data indicating whether the currently controlled intelligent home appliance terminal is in a normal operating state, power consumption data of the currently controlled intelligent home appliance terminal, a fault type of a fault that occurs in the currently controlled intelligent home appliance terminal, data of a mode in which the currently controlled intelligent home appliance terminal is started, data of time when the currently controlled intelligent home appliance terminal is automatically started, data of duration in which the currently controlled intelligent home appliance terminal is automatically started, data of the number of times the currently controlled intelligent home appliance terminal is automatically started within a preset time, and an automatic feeding amount of the currently controlled intelligent home appliance terminal.

Optionally, the intelligent home appliance terminal managed by the intelligent home appliance terminal management module comprises at least one of the following: an air conditioner, a robot, a door lock, a refrigerator, a washing machine, an automatic pet feeder, an automatic pet water feeder, an oven, and an intelligent speaker.

In accordance with the above system, the present invention provides an intelligent service method in another aspect, the method comprising: determining a first theme type according to collected big data of different user groups; obtaining, by means of matching, each application corresponding to each theme type according to the first theme type, and displaying each application corresponding to each theme type on a display screen; recognizing, after receiving a first manipulation instruction from a user, a theme type corresponding to the first manipulation instruction, and displaying each application matching the theme type on the display screen; and recognizing, after receiving a second manipulation instruction from the user, an application corresponding to the second manipulation instruction, importing the corresponding application, and starting the operating of the application.

Optionally, the way of starting an intelligent service platform comprises at least one of the following: typing a keyword related to the name of the intelligent service platform and/or the full name of the name of the intelligent service platform; touching an icon of an APP of the intelligent service platform that is displayed on the display screen; and starting the intelligent service platform in the form of voice.

Optionally, the method further comprises: finding, by means of searching, corresponding content based on a satisfied preset condition and a search method matching the condition, and pushing the content to a specified user, wherein the pushed content comprises at least: a column name of the next-level column associated with a current column, a pushed travel plan, pushed audio and video works of a comic dialogist, a pushed television or movie work of an actor, the pushing of a third-party application whose frequency of use by the current user is higher than a corresponding preset frequency, the pushing of a user independently-developed application whose frequency of use by the current user is higher than a corresponding preset frequency, the pushing of the brand of a commodity whose frequency of consumption by the current user is higher than a corresponding preset frequency, the pushing of a restaurant whose frequency of consumption by the current user is higher than a corresponding preset frequency, and the pushing of a theater whose frequency of consumption by the current user is higher than a corresponding preset frequency; and/or the search method comprises at least one of the following: finding, by means of searching, a column name of the next-level column associated with the current column in a cross search manner; finding, by means of searching, at least one item of pushed content associated with a search keyword in a fuzzy search manner; and finding, by means of searching, at least one item of corresponding pushed content according to one or more of information of frequency of consumption by the current user, information of a consumption behavior of the current user, and historical search data of the current user.

Optionally, the method further comprises:
acquiring configuration information of an APP of the intelligent service platform on a smart phone, and synchronously pushing the configuration information to a terminal device installed with the APP of the intelligent service platform, wherein the terminal device comprises at least one or more of another smart phone, a computer, a television, and an automobile terminal device.

The present invention has the following advantages: the intelligent service platform comprises a theme type determining module, a matching module, a theme type recognition module, an application recognition module, an application importing module, and a program starting module, wherein the theme type recognition module recognizes, after receiving a first manipulation instruction from a user, a theme type corresponding to the first manipulation instruction, and displays each application matching the theme type on a display screen; and the application recognition module recognizes, after receiving a second manipulation instruction from the user, an application corresponding to the second manipulation instruction, imports the corresponding application through the application importing module, and starts the operating of the application through the program starting module. In this way, the intelligent service platform classifies a wide variety of existing applications with similar functions, so that user interfaces of user applications are more concise, and the user experience is improved.

Figure 1:
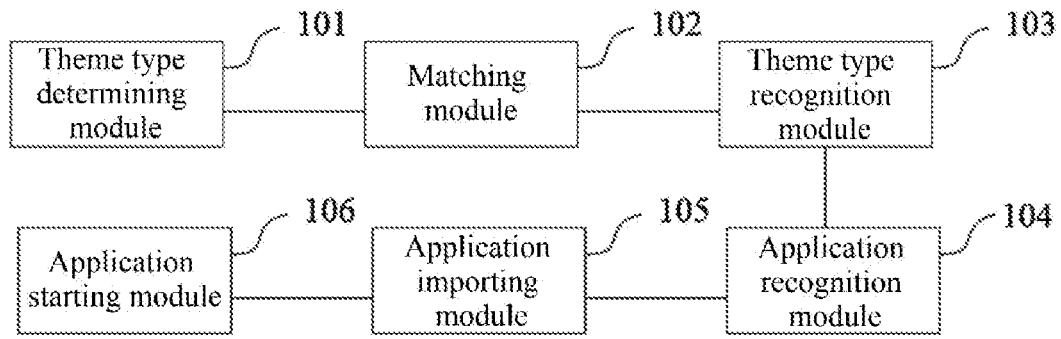
FIG. 1 is a schematic structural diagram of an embodiment of an intelligent service platform of the present invention.

In conjunction with the drawings, reference numerals in the embodiments of the present invention are as follows:

101—Theme type determining module; 102—Matching module; 103—Theme type recognition module; 104—Application recognition module; 105—Application importing module; and 106—Application starting module.

DETAILED DESCRIPTION OF THE EMBODIMENTS

The following embodiments are intended to illustrate the present invention, but not to limit the scope of the present invention.

Embodiment 1

According to an embodiment of the present invention, an intelligent service platform is provided. Reference is made to a schematic structural diagram of an embodiment of an intelligent service platform of the present invention shown in FIG. 1. The intelligent service platform comprises a theme type determining module 101, a matching module 102, a theme type recognition module 103, an application recognition module 104, an application importing module 105, and an application starting module 106, wherein the theme type determining module 101 determines a first theme type according to collected big data of different user groups;

the matching module 102 obtains, by means of matching, each application corresponding to each theme type according to the first theme type, and displays each application corresponding to each theme type on a display screen;

the theme type recognition module 103 recognizes, after receiving a first manipulation instruction from a user, a theme type corresponding to the first manipulation instruction, and displays each application matching the theme type on the display screen; and the application recognition module 104 recognizes, after receiving a second manipulation instruction from the user, an application corresponding to the second manipulation instruction, imports the corresponding application through the application importing module 105, and starts the operating of the application through the program starting module 106. In this way, the intelligent service platform classifies a wide variety of existing applications with similar functions, so that user interfaces of user applications are more concise, and the user experience is improved.

In an optional example, the first theme type comprises at least one of the following: an intelligent home control center, a transportation means control center, local or community, news, video, audio, search, social contact, shopping, catering, travel, entertainment, health, education, and office; and the first theme type is a theme type obtained by classifying numerous applications according to collected big data of applications commonly used by a large number of user groups.

In an optional example, the application comprises at least one of a third-party application and a user independently-developed application. In this way, it is not only convenient for a user to use mature applications with existing functions, but also convenient for the user to independently develop applications according to their own needs, so as to solve their actual needs in a targeted manner.

In an optional example, the theme type determining module 101 is further used to determine a corresponding second theme type according to preference information of the user, wherein the preference information of the user comprises at least one of the following: information of the third-party application and/or the independently-developed application whose frequency of use by the current user is higher than a corresponding preset frequency, information of a theme type corresponding to the third-party application, information of a theme type corresponding to the independently-developed application, information of a commodity that the current user follows, information of the brand of the commodity that the current user follows, information of a store for the commodity that the current user follows, information of a consumption behavior of the current user, and information of a consumption frequency of the current user. In this way, the intelligent service platform can not only determine an intelligent service platform suitable for the public according to the big data obtained through statistics on a large number of user groups, but also can customize, according to preference information of the current user, an intelligent service platform that accords with use preferences of the current user in a targeted manner, so that the intelligent service platform customized for the current user more conforms to the needs of the user, and user interfaces of user applications are more concise.

In actual applications, if the current user likes shopping, shopping-type applications, such as Taobao, jingdong, and Vipshop, are correspondingly highlighted on a display interface of the terminal device. If the current user likes reading e-books, e-book-type applications, such as Amazon's kindle, Jingdong reading, and palm reading, are correspondingly highlighted on the display interface of the terminal device.

In an optional example, the platform further comprises an intelligent home appliance terminal management module, the intelligent home appliance terminal management module managing collected operating data of a controlled intelligent home appliance terminal, wherein the operating data comprises at least one of the following: data indicating whether the currently controlled intelligent home appliance terminal is in a normal operating state, power consumption data of the currently controlled intelligent home appliance terminal, a fault type of a fault that occurs in the currently controlled intelligent home appliance terminal, data of a mode in which the currently controlled intelligent home appliance terminal is started, data of time when the currently controlled intelligent home appliance terminal is automatically started, data of duration in which the currently controlled intelligent home appliance terminal is automatically started, data of the number of times the currently controlled intelligent home appliance terminal is automatically started within a preset time, and an automatic feeding amount of the currently controlled intelligent home appliance terminal. In this way, the intelligent service platform can also intelligently control more and more intelligent home appliance terminals now.

In actual applications, when an owner is on a business trip, the owner can see his/her pet through a video apparatus mounted on an intelligent feeder, and can also remotely control a specific daily feeding time and a specific daily feeding amount of the intelligent feeder.

In an optional example, the intelligent home appliance terminal managed by the intelligent home appliance terminal management module comprises at least one of the following: an air conditioner, a robot, a door lock, a refrigerator, a washing machine, an automatic pet feeder, an automatic pet water feeder, an oven, and an intelligent speaker. In this way, various types of intelligent home appliance terminals can be controlled by the intelligent service platform, which simplifies the effective management of existing numerous applications for controlling the intelligent home appliance terminals.

Embodiment 2

Figure 2:
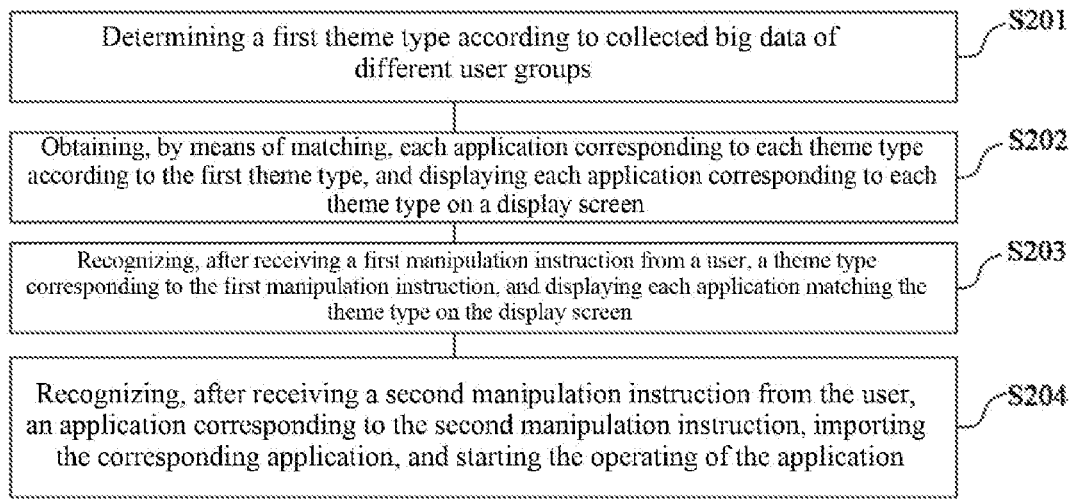
FIG. 2 is a schematic flowchart of an embodiment of an intelligent service method of the present invention.

According to an embodiment of the present invention, an intelligent service method corresponding to the intelligent service platform is provided. As shown in FIG. 2, it is a schematic flowchart of an embodiment of an intelligent service method of the present invention. The method comprises at least the steps of:

S201, determining a first theme type according to collected big data of different user groups;

S202, obtaining, by means of matching, each application corresponding to each theme type according to the first theme type, and displaying each application corresponding to each theme type on a display screen;

S203, recognizing, after receiving a first manipulation instruction from a user, a theme type corresponding to the first manipulation instruction, and displaying each application matching the theme type on the display screen; and

S204, recognizing, after receiving a second manipulation instruction from the user, an application corresponding to the second manipulation instruction, importing the corresponding application, and starting the operating of the application. In this way, the intelligent service method can classify a wide variety of existing applications with similar functions, so that user interfaces of user applications are more concise, and the user experience is improved.

In an optional example, the way of starting an intelligent service platform comprises at least one of the following:

typing a keyword related to the name of the intelligent service platform and/or the full name of the name of the intelligent service platform;

touching an icon of an APP (Application) of the intelligent service platform that is displayed on the display screen, wherein the APP generally refers to mobile phone software; and starting the intelligent service platform in the form of voice. In this way, the application of the intelligent service platform can be conveniently woken up and started by using one of the above various methods.

In actual applications, after the application is woken up in any manner such as typing, touching, and voice, a user can enter the application or directly enter a second-level interface.

The second-level interface displayed after entering the application can be provided with columns such as an "intelligent home control center", a "transportation means control center", "local or community", "news", "video", "audio", "search", "social contact", "shopping", "catering", "travel", "entertainment", "health", "education", and "office".

If the current user chooses to enter one of them, for example, entering the "intelligent home control center", a control program of a device such as an "air conditioner", a "robot", a "door lock", and a "refrigerator" can be displayed;

if the current user chooses to enter "shopping", all shopping "APPs" such as "Taobao", "Jingdong", "Amazon", and "Suning" can be displayed; and if the current user chooses to enter "travel", websites related to travel such as "Ctrip", "Fliggy", "Airbnb", "Didi Chuxing", and "Qyer" are displayed.

In actual applications, the user can also choose to enter a third-level interface, for example, entering the "robot", and a control program of a device such as a "companion robot", a "chatting robot", and a "guardianship robot" can be displayed.

For another example, the current user chooses to enter "Amazon", and content such as "homepage", and "category" can be displayed.

The user can also customize an interface at each level according to personal habits, hobbies, etc.—after entering the interface at each level, displaying default common columns, and recommending linked applications; and the user is supported in developing a program by himself and in linking the developed application to any application.

It should be noted that the intelligent service method provided in the embodiments of the present invention is to use the application of the intelligent service platform in the embodiments of the present invention, wherein the application has different versions, for example, an Android version, an IOS (a mobile operating system from Apple Inc.) version, and various Windows versions suitable for desktops, and the application has versions suitable for all application systems on the market. The above only illustrates several common versions, and the details will not be described herein again. In this way, the application has different versions to meet user groups with different use habits.

In an optional example, the method further comprises: finding, by means of searching, corresponding content based on a satisfied preset condition and a search method matching the condition, and pushing the content to a specified user, wherein the pushed content comprises at least: a column name of the next-level column associated with a current column, a pushed travel plan, pushed audio and video works of a comic dialogist, a pushed television or movie work of an actor, the pushing of a third-party application whose frequency of use by the current user is higher than a corresponding preset frequency, the pushing of a user independently-developed application whose frequency of use by the current user is higher than a corresponding preset frequency, the pushing of the brand of a commodity whose frequency of consumption by the current user is higher than a corresponding preset frequency, the pushing of a restaurant whose frequency of consumption by the current user is higher than a corresponding preset frequency, and the pushing of a theater whose frequency of consumption by the current user is higher than a corresponding preset frequency; In this way, the intelligent service method provided in the embodiments of the present invention is more intelligent, and content that a specific user may like can be pushed to the user in a targeted manner according to collected consumption habits of the user and preference types of the user.

In an optional example, the search method used in the intelligent service method provided in the embodiment of the present invention comprises at least one of the following:

finding, by means of searching, a column name of the next-level column associated with the current column in a cross search manner. In actual applications, cross search is supported. For example, when the user enters "local", the next-level columns such as "news", "shopping", "travel", and "health" can be displayed; and when the user enters "news", the next-level columns such as "local", and "education" can also be displayed.

Finding, by means of searching, at least one item of pushed content associated with a search keyword in a fuzzy search manner. In actual applications, fuzzy input and fuzzy search are supported. For example, when inputting "I want to eat Lanzhou Hand-Pulled Noodles with Beef" or "Lanzhou Hand-Pulled Noodles with Beef" or "Hand-Pulled Noodles with Beef", etc. in a manner of text, audio, or brain waves, etc., the user can enter an APP such as "Heine", "Dianping", and "Meituan", and stores that can provide such a service are displayed according to the priory of "positive evaluation", "popularity", or "price", etc. For another example, when inputting "I want to listen to a comic dialog", the user can enter an application such as "Himalaya", "Blog", and "Youku", and can enter special pages of Baolin Hot', Gong Feng, Degang Guo, etc. to click and select their representative works or any work. For another example, when inputting "I want to go to Hokkaido", the user can enter an APP such as "Ctrip", "Fliggy", and "Qyer", and a plan to travel to Hokkaido, Japan by air or sea is provided.

Finding, by means of searching, at least one item of corresponding pushed content according to one or more of information of frequency of consumption by the current user, information of a consumption behavior of the current user, and historical search data of the current user. In actual applications, intelligent search is supported, and as the number of use times increases, the application becomes more and more personalized. For example, for an "APP" that has been browsed, a brand of a commodity that has been purchased, a restaurant or a theater that has been visited, etc., results are preferentially provided during search according to a frequency and behavior of consumption; and search instructions that have been used are preferentially displayed according to the frequency of use, etc.

What is claimed is:

1. An intelligent service method of an intelligent service platform, comprising:
   determining a first theme type according to collected big data of a plurality of different user groups;
   determining a second theme type according to user preference information;
   obtaining, by means of matching, each application corresponding to each theme type according to the first theme type and the second theme type, and displaying the each application corresponding to the each theme type on a display screen;
   recognizing, after receiving a first manipulation instruction from a user, a theme type corresponding to the first manipulation instruction, and displaying the each application matching the theme type on the display screen; and recognizing, after receiving a second manipulation instruction from the user, an application corresponding to the second manipulation instruction, importing a corresponding application, and starting operating of the application, wherein the method further comprises:

finding, by means of searching, a corresponding content based on a satisfied preset condition and a search method matching a condition, and pushing the content to a specified user, wherein a pushed content comprises at least: a column name of a next-level column associated with a current column, a pushed travel plan, pushed audio and video works of a comic dialogist, a pushed television or movie work of an actor, pushing of a third-party application wherein frequency of use of the pushing of the third-party application by a current user is higher than a corresponding preset frequency, pushing of an independently-developed application wherein frequency of use of the pushing of the independently-developed application by the current user is higher than a corresponding preset frequency, pushing of a brand of a commodity wherein frequency of consumption of the pushing of the brand of the commodity by the current user is higher than a corresponding preset frequency, pushing of a restaurant wherein frequency of consumption of the pushing of the restaurant by the current user is higher than a corresponding preset frequency, and pushing of a theater wherein frequency of consumption of the pushing of the theater by the current user is higher than a corresponding frequency, wherein the preference information of the user comprises at least one of the following:

information of a third-party application and/or an independently-developed application wherein frequency of use of the pushing of the independently-developed application by a current user is higher than a corresponding preset frequency, information of a theme type corresponding to the third-party application, information of a theme type corresponding to the independently-developed application, information of a commodity wherein the current user follows the commodity, information of a brand of the commodity wherein the current user follows the brand of the commodity, information of a store for the commodity wherein the current user follows the store for the commodity, information of a consumption behavior of the current user, and information of a consumption frequency of the current user;

wherein the first theme type comprises at least one of the following:

an intelligent home control center, a transportation means control center, local or community, news, video, audio, search, social contact, shopping, catering, travel, entertainment, health, education, and office; and wherein the application comprises at least one of the third-party application and the independently-developed application.

2. The intelligent service method according to claim 1, wherein a way of starting the intelligent service platform comprises at least one of the following:

typing a keyword related to a name of the intelligent service platform and/or a full name of the name of the intelligent service platform;

touching an icon of an APP of the intelligent service platform wherein the icon of the APP of the intelligent service platform is displayed on the display screen; and starting the intelligent service platform in a form of a voice.

3. The intelligent service method according to claim 1, wherein the search method comprises at least one of the following:

finding, by means of searching, a column name of the next-level column associated with the current column in a cross search manner;

finding, by means of searching, at least one item of the pushed content associated with a search keyword in a fuzzy search manner; and finding, by means of searching, at least one item of a corresponding pushed content according to one or more of information of a frequency of consumption by the current user, information of a consumption behavior of the current user, and historical search data of the current user.

4. The intelligent service method according to claim 1, wherein the method further comprises:

acquiring configuration information of an APP of the intelligent service platform on a smart phone, and synchronously pushing the configuration information to a terminal device installed with the APP of the intelligent service platform, wherein the terminal device comprises at least one or more of an other smart phone, a computer, a television, and an automobile terminal device.

* * * * *